(12) United States Patent
McEwan

(10) Patent No.: US 7,952,515 B2
(45) Date of Patent: May 31, 2011

(54) RANGE GATED HOLOGRAPHIC RADAR

(75) Inventor: Thomas Edward McEwan, Las Vegas, NV (US)

(73) Assignee: M$^c$Ewan Technologies, LLC, Las Vegas, NV (US)

( * ) Notice: Subject to any disclaimer, the term of this patent is extended or adjusted under 35 U.S.C. 154(b) by 190 days.

(21) Appl. No.: 12/380,324

(22) Filed: Feb. 26, 2009

(65) Prior Publication Data

US 2010/0214157 A1  Aug. 26, 2010

(51) Int. Cl.
*G01S 13/22* (2006.01)
*G01S 13/18* (2006.01)
*G01S 7/483* (2006.01)
*G01S 13/00* (2006.01)

(52) U.S. Cl. ............ 342/156; 342/89; 342/94; 342/118; 342/128; 342/130; 342/131; 342/132; 342/134; 342/137; 342/147; 342/175; 342/176; 342/179; 342/194; 342/195

(58) Field of Classification Search .............. 342/27, 342/28, 59, 118, 134–144, 147, 156, 175, 342/176, 179, 192–197, 89–103, 21, 22, 342/149–155, 159–162, 165, 173, 174, 180, 342/368, 374, 450, 127–133; 356/450, 457–476, 356/496
See application file for complete search history.

(56) References Cited

U.S. PATENT DOCUMENTS

| | | | | |
|---|---|---|---|---|
| 3,368,218 A | * | 2/1968 | Fenn et al. | 342/156 |
| 3,438,033 A | * | 4/1969 | Preston | 342/156 |
| 3,454,944 A | * | 7/1969 | Preston | 342/59 |
| 3,480,957 A | * | 11/1969 | Kosowsky | 342/136 |
| 3,594,794 A | * | 7/1971 | Halpern | 342/156 |
| 3,728,727 A | * | 4/1973 | Botwin et al. | 342/156 |
| 3,735,399 A | * | 5/1973 | Sletten et al. | 342/161 |
| 3,761,927 A | * | 9/1973 | Amoroso, Jr. | 342/156 |
| 3,766,556 A | * | 10/1973 | Amoroso, Jr. | 342/156 |
| 3,942,177 A | * | 3/1976 | Danzer et al. | 342/156 |
| 4,021,771 A | * | 5/1977 | Collins et al. | 342/180 |
| 4,150,375 A | * | 4/1979 | Ross et al. | 342/21 |
| 4,209,853 A | * | 6/1980 | Hyatt | 342/179 |
| 4,630,051 A | * | 12/1986 | Adams et al. | 342/156 |
| 4,717,916 A | * | 1/1988 | Adams et al. | 342/156 |
| 5,170,170 A | | 12/1992 | Soumekh | |
| 5,327,139 A | * | 7/1994 | Johnson | 342/22 |
| 5,455,590 A | | 10/1995 | Collins et al. | |
| 5,557,283 A | * | 9/1996 | Sheen et al. | 342/179 |
| 5,559,515 A | * | 9/1996 | Alimena et al. | 342/118 |
| 5,559,516 A | * | 9/1996 | Didomizio et al. | 342/118 |
| 5,559,517 A | * | 9/1996 | Didomizio | 342/156 |
| 5,559,518 A | * | 9/1996 | DiDomizio | 342/174 |
| 5,818,383 A | | 10/1998 | Stockburger et al. | |
| 5,859,609 A | * | 1/1999 | Sheen et al. | 342/179 |
| 5,872,628 A | * | 2/1999 | Erskine | 356/496 |

(Continued)

*Primary Examiner* — Bernarr E Gregory

(57) ABSTRACT

Narrow virtual transmit pulses are synthesized by differencing long-duration, staggered pulse repetition interval (PRI) transmit pulses. PRI is staggered at an intermediate frequency IF. Echoes from virtual pulses form IF-modulated interference patterns with a reference wave. Samples of interference patterns are IF-filtered to produce high spatial resolution holographic data. PRI stagger can be very small, e.g., 1-ns, to produce a 1-ns virtual pulse from very long, staggered transmit pulses. Occupied Bandwidth (OBW) can be less than 10 MHz due to long RF pulses needed for holography, while spatial resolution can be very high, corresponding to ultra-wideband (UWB) operation, due to short virtual pulses. X-Y antenna scanning can produce range-gated surface holograms from quadrature data. Multiple range gates can produce stacked-in-range holograms. Motion and vibration can be detected by changes in interference patterns within a range-gated zone.

11 Claims, 9 Drawing Sheets

U.S. PATENT DOCUMENTS

| | | | |
|---|---|---|---|
| 5,966,090 A * | 10/1999 | McEwan | 342/27 |
| 6,025,800 A * | 2/2000 | Hager | 342/450 |
| 6,191,724 B1 * | 2/2001 | McEwan | 342/21 |
| 6,288,672 B1 * | 9/2001 | Asano et al. | 342/374 |
| 6,414,627 B1 * | 7/2002 | McEwan | 342/134 |
| 6,462,705 B1 | 10/2002 | McEwan | |
| 6,492,933 B1 | 12/2002 | McEwan | |
| 6,621,448 B1 | 9/2003 | Lasky et al. | |
| 6,624,781 B1 * | 9/2003 | Collins | 342/22 |
| 7,167,123 B2 | 1/2007 | Hausner et al. | |
| 7,737,876 B2 * | 6/2010 | Pavlov et al. | 342/22 |

\* cited by examiner

RANGE GATED HOLOGRAPHIC RADAR

BACKGROUND OF THE INVENTION

1. Field of the Invention

The present invention relates to radar and more particularly to interferometric and holographic radar. The invention can be used to form holograms, to form stacked holograms, to detect motion and vibration within a gated region, and to find range.

2. Description of Related Art

Pulse echo and FMCW high resolution radars typically have emissions that are wideband to ultra-wideband (UWB). UWB impulse radars emit short pulses of ½ to one RF cycle in duration, with corresponding bandwidths extending from 500 MHz to 10 GHz or more. Wideband pulse-echo radars emit bursts of RF sinusoids; tank level sensing radars typically emit 10 to 20 RF sinusoids in a burst with a corresponding bandwidth of greater than several hundred megahertz. Similar bandwidths pertain to high resolution FMCW radars. Operation of these high bandwidth radars is severely restricted by regulatory agencies such as the FCC. Examples of these restrictions include: (1) UWB radars in the U.S. can only be operated outdoors with extremely limited radiated power levels and only when handheld; (2) wideband tank level sensing radars can only be operated inside tanks, and cannot be used to sense river levels, for example; and (3) ISM bandwidth is very limited, such as the 50 MHz wide 10.5 GHz band.

While high bandwidth radar is subject to severe regulatory limitations, operation without a range-gate introduces other severe limitations. It should be noted that the use of a range gate generally infers high bandwidth. Range gating usually requires high spatial resolution, which implies a narrow sampling aperture and matching narrow, high bandwidth emission pulse. Short range radars, and generally, radar sensors, frequently require very high resolution gating.

CW Doppler radars are commonly used to sense motion. However, these radars have no maximum range limit. Undesired moving objects, i.e., clutter at any range can produce a response. The lack of a range gate may be ideal for police speed-sensing radar, but it is completely undesirable for security alarms; a person moving outside a protected zone could false-rigger an ungated radar. A range gate is clearly needed in many applications. Numerous range-gated motion sensing radars exist in the prior art; yet they often require high bandwidths and are thus subject to tight regulatory restriction. A low bandwidth range-gated radar is needed.

A holographic radar is disclosed in U.S. Pat. No. 5,455,590, "Real-Time Holographic Surveillance System," by Collins et al. An apparatus is disclosed that forms a holographic radar image by scanning an antenna along X and Y axes. However, the radar is a CW radar and has no range gating. Thus, the holographic image can be contaminated by echoes from outside the image plane. It is only practical in situations where the clutter scene can be tightly controlled. Further, it can only work with objects that are not semi-transparent to radar; e.g., forming a holographic image of a wood or plastic surface could be difficult if not impossible. Time gating, i.e., range gating, of the radar echoes is needed. The '590 cannot form stacked holograms, i.e., holograms representing multiple surfaces or slices inside a solid, since there is no time-gating to resolve echoes in the downrange direction.

The prior art lacks: (1) a low bandwidth radar with high spatial resolution range gating; (2) a high resolution radar that can operate in narrow ISM bands; (3) a high resolution radar that is high immune to interference so it can operate in crowded ISM bands; (4) a holographic radar than rejects clutter; (5) a holographic radar that can image semitransparent objects; (6) a holographic radar that can form stacked holographic images; and (7) a narrowband motion sensing radar with close-in range gating.

SUMMARY OF THE INVENTION

The invention is a range-gated holographic radar including a PRI generator for producing PRI pulses, an intermediate frequency IF generator for producing an IF modulation signal, a stagger modulator responsive to the clock pulses and to the IF modulation signal for producing staggered PRI pulses, a first pulse generator responsive to the stagger PRI pulses for generating transmit pulses having a duration longer than the longest transmit pulse to desired echo duration, an RF oscillator responsive to the transmit pulses for producing transmit RF bursts and which also form reference waves, an antenna connected to the RF oscillator for radiating the transmit RF bursts and for receiving echoes from the bursts, a range delay element connected to the PRI generator for producing range delay pulses, a second pulse generator responsive to the range delay pulses for generating gate pulses, an RF magnitude detector responsive to the gate pulses and connected to the antenna for producing RF magnitude samples of the sum of the reference waves and echoes, an IF filter for passing magnitude samples having IF modulation; and an IF detector for demodulating the filtered magnitude samples and for producing an interferometric output signal.

The radar of can also include a gated RF peak detector for detecting and integrating RF pulse peaks during one or more gate intervals. The RF magnitude sampler can further include a second RF magnitude sampler, each sampler connected to spaced-apart taps on a transmission line connected between the RF oscillator and the antenna, for producing RF magnitude samples of the sum of transmit RF bursts and echoes and for producing quadrature interferometric output signals.

Another embodiment of the invention forms a quadrature narrowband RF magnitude sampler that includes a first diode for providing a first conduction element, a second diode for providing a second conduction element, a first RF port coupled to a transmission line and coupled to the first diode for coupling a narrowband RF signal to the first diode, a second RF port coupled to a transmission line and coupled to the second diode for coupling the RF signal to the second diode, wherein the second port is physically spaced apart from the first port by a fraction of a wavelength along the transmission line, a gate port coupled to the first and second diodes for coupling a unipolar gate pulse to the diodes, wherein the gate pulse drives the diodes into conduction during the gate pulse duration and during a portion of at least two RF signal cycles to produce conduction pulses in the first and second diodes, a first integrating capacitor coupled to the first diode for integrating at least two conduction pulses and for producing in-phase samples, and a second integrating capacitor coupled to the second diode for integrating at least two conduction pulses and for producing quadrature-phase samples. The radar can further include staggered PRI modulation where the intermediate frequency is modulated with a stagger timing offset of $\Delta T$.

The invention is a range gated holographic radar sensor that includes a pulsed RF oscillator for providing RF bursts, each burst occurring with a staggered PRI modulation of $\Delta$ and having a burst duration longer than the expected echo delay; an antenna for transmitting RF bursts and receiving echoes of the RF bursts; and a time-gated RF sampler responsive to the sum of the RF bursts and echoes produced by the Δ modulation for producing interferometric output samples.

The invention includes a method of interferometric radar sensing, including generating an RF burst of sufficient duration to include a desired echo from the burst; radiating the RF burst from an antenna towards a target; receiving a target echo of the burst with an antenna; summing the RF burst and echo to produce an interferometric signal; and magnitude sampling the interferometric signal with controlled timing to produce a range-gated interferometric sample of the echo. It can also include sampling the magnitude of the interferometric signal at two points on a transmission line with controlled timing to produce range-gated quadrature interferometric samples. It can further include generating an RF burst having a staggered PRI. It can additionally include magnitude sampling responsive to the Δ stagger at the intermediate frequency.

The invention further includes a method of interferometric radar motion sensing, including generating RF bursts of sufficient duration to include desired echoes from the burst; radiating the RF bursts from an antenna towards a target; receiving target echoes of the bursts with an antenna; summing the RF bursts and echoes to produce interferometric signals; magnitude sampling the interferometric signals with fixed timing to produce a sample signal from target echoes at a fixed range; and detecting changes in the sample signal to produce a motion signal. Additionally, this method can also include sampling the magnitude of the interferometric signal at two points on a transmission line with controlled timing to produce range-gated quadrature interferometric signals.

Objects of the present invention are: (1) to add a range gate to a holographic radar to exclude extraneous echoes; (2) to add a range gate to a holographic radar to allow the formation of stacked holograms; (3) to provide a radar with narrowband emissions combined with high spatial resolution; (4) to provide a high resolution radar with narrowband emissions to comply with ISM band regulations; (5) to provide a low noise range gated narrowband motion sensor; and (6) to provide a narrowband, high resolution swept range A-scan radar

DETAILED DESCRIPTION OF THE INVENTION

Figure 1:
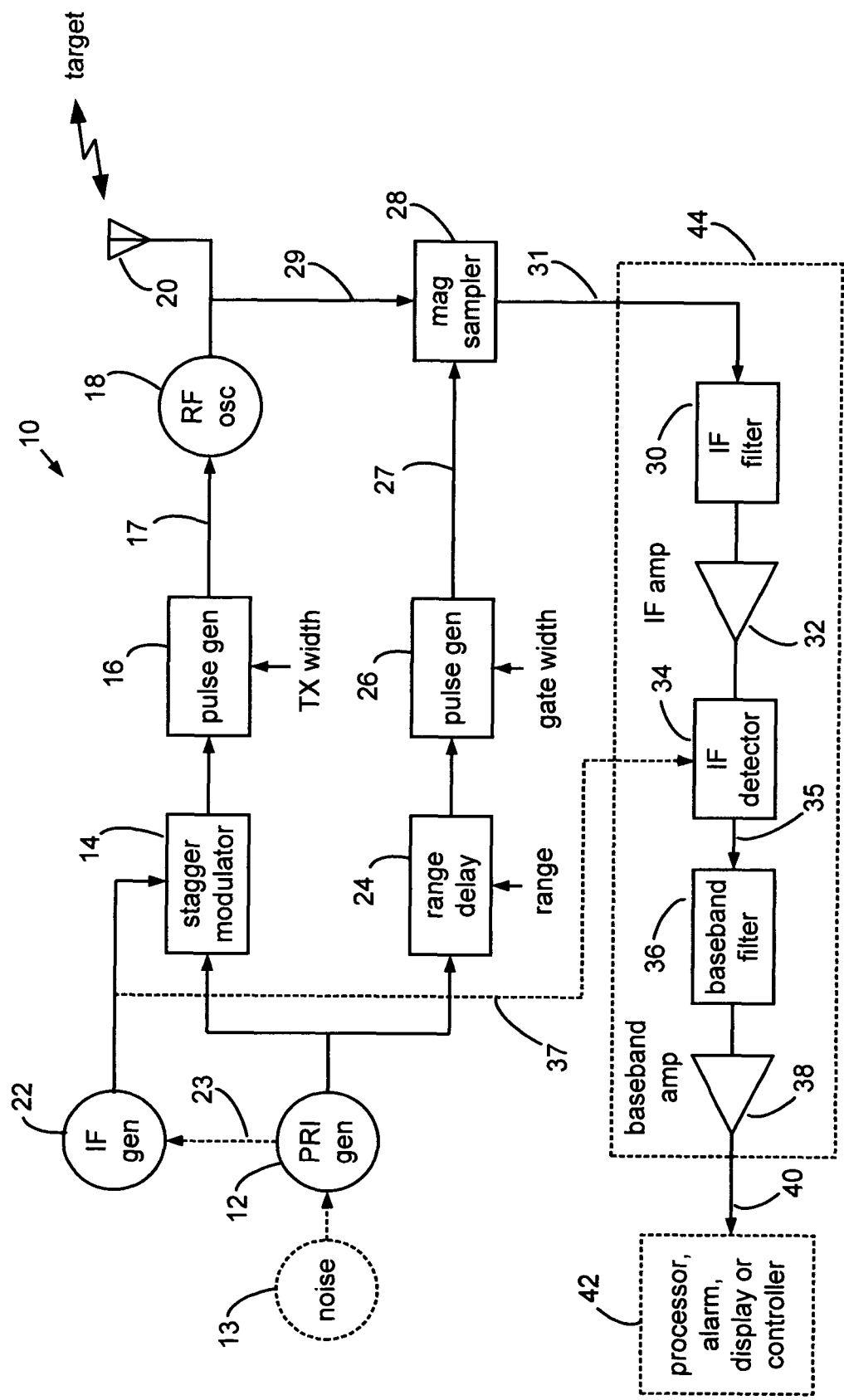
FIG. 1 is a block diagram of a radar of the present invention.

A detailed description of the present invention is provided below with reference to the figures. While illustrative component values and circuit parameters are given, other embodiments can be constructed with other component values and circuit parameters.

General Description

The present invention overcomes the limitations of prior art holographic radar by introducing a range gate to limit response to a specific downrange region. Consequently, cleaner, more clutter-free radar holograms of an imaged surface can be obtained, particularly when penetrating materials to image interior image planes, or slices. Range-gating also enables stacked hologram technology, where multiple imaged surfaces can be stacked in the downrange direction. Holograms of interior slices of a solid object can include slices of a tree, interior slices of human organs, and depth-wise slices from ground penetrating holographic radar, such as holographic images of buried tombstones.

The present invention is range-gated holographic radar that emits a wide RF burst that also serves as a reference wave. Wide pulses have an associated narrow bandwidth. Consequently, the radar can operate in the international ISM bands. This is a major breakthrough for rangefinder and motion sensor applications that have had to operate under restrictive regulatory limitations that prohibited their operation in the ISM bands.

The time of emission of the wide RF pulses can be staggered, i.e., have a PRI to PRI (pulse repetition interval) interval variation of Δ that repeats at an intermediate stagger frequency IF. Echo samples taken after the start of the wide RF bursts contain a spectral component at IF. IF filtered samples are responsive only to the Δ interval. Since the Δ interval is formed at the start of the wide RF transmit bursts and only persists for a short duration Δ, it is as though a very short ultra-wideband virtual pulse is transmitted. The temporal location of the virtual pulse starts at the start of the non-staggered (or non-delayed) PRI's and ends with the start of the staggered PRI's. It is termed a virtual pulse since no actual short pulse exists; it is formed by subtracting non-staggered wide pulses from staggered wide pulses, i.e., formed across multiple PRI's.

Echoes of the virtual pulse combine with the on-going wide transmit pulse to form a virtual interferometric pattern; it is a pattern that exists at the IF and relates to phase and amplitude variations produced by the short virtual pulse. Clearly, the transmit pulse must be sufficiently wide to persist while desired echoes are received, otherwise no virtual interference pattern will form. When a virtual interference pattern is sampled at a fixed range, a single pixel hologram is obtained. Scanning the antenna in an X-Y plane will produce a 2D interferometric pattern similar to a holographic pattern on a photographic negative. However, the range-gating feature limits the pattern response to a specific downrange region defined by the location and width of the range gate. By changing gate location, other holograms can be obtained at other ranges.

Interference patterns are sampled with a specially devised sampler that is responsive to magnitude and not to phase; there is no dependence on gate pulse timing relative to RF phase. Conventional mixers, correlators and sample-holds all produce a response that varies with the timing of the gate pulse relative to the sampled RF signal. If used in the present invention, these devices would produce a very large a spurious response related to the phase and phase noise between the gate pulse and the RF interferometric signal. For example, at an RF frequency of 24 GHz, the duration of ¼ of a wave is 10 ps, and the gate pulse may need to be delayed for 100 ns (15 m in range). Clearly, gate timing jitter of 0.1 ps can result in significant noise. Phase sensitive detectors are not desirable in this application. A magnitude-only sampler is needed.

A magnitude-only sampler that overcomes the limitations of the various prior sampling devices is disclosed herein and further disclosed in copending U.S. patent application Ser. No. 12/380,337, filed Feb. 26, 2009 "RF Magnitude Sampler for Holographic Radar," by the present inventor, Thomas E. McEwan. It employs a gated peak detector to produce phase-independent magnitude samples of an RF signal. The new sampler operates by peak detecting RF signals with a time-gated peak detector and by integrating the peak detector output to provide an output sample. In one embodiment, an RF signal is summed with a gate pulse and applied to a Schottky diode, where the RF peaks in the summed waveform drive the diode into conduction and produce diode conduction current pulses only during the gate pulse duration. The diode conduction pulses are coupled to a capacitor or lowpass filter and integrated. When the gate pulse spans at least two RF cycles, two RF peaks will always occur within the duration of the gate pulse. Voltage on the capacitor will charge to maximum output within two RF cycles, or within a larger number of cycles depending on design parameters. Once the charge reaches maximum, no further change in sampled output will occur for continuing RF input signals of the same or lower amplitude. The sample amplitude is unaffected by the phase of the RF signal as long as two peaks occur within the gate duration.

A significant feature of short duration sampling, when sample integration is included, is great immunity to RF interference. When N samples are taken and integrated, conventional wisdom suggests that sampled noise and interference voltage is reduced according to the square-root of N. A motion sensing radar of the present invention might integrate N=10,000 pulses, and conventionally one might expect noise and interference to decrease 100-fold due to integration. However, the present invention is configured with a moving average integrator such that each of 10,000 signal samples increment an integration capacitor by $1/10{,}000$ of its final value. This is a form of signed, coherent integration, where 10,000 samples of the same polarity and magnitude are needed to increment the integration capacitor to a final value representative of the current value of the input signal. When the radar PRI is randomized, samples of external interfering signals are randomized while samples of echoes remain coherent. The random samples are signed samples, some positive and some negative. If each sample of external noise is random and increments or decrements the integration capacitor voltage by $1/10{,}000$, it can be seen that a sequence of random polarity samples will average to zero with a small variance. Thus, noise is rejected by a factor related to N, not the square root of N. It is for this same reason that the response of a spectrum analyzer to a very short pulse is desensitized as 20 logBT and not 10 logBT as one might expect by conventional reasoning, where B=spectrum analyzer bandwidth and T=RF pulse width. This is one of the widely claimed UWB technology advantages, and the present invention retains this advantage due to its integrating sampler and its optional downstream integration. Tests indicate a radar motion sensor of the present invention can operate in the 2.4 GHz ISM band with nearby Bluetooth, WiFi, GSM cell phone and other devices with no apparent interference.

Image processing in holographic radar requires both magnitude and phase information in a quadrature format. This is also true in other applications such as motion and vibration sensing. Quadrature sampling of the interference pattern can provide the necessary quadrature data without losing the advantages of magnitude-only sampling.

Full four quadrant quadrature sampling is realized in the present invention while using magnitude-only sampling. When reference RF bursts and echo RF signals are propagated along a transmission line, interference patterns form as distributed patterns along the transmission line. Two magnitude samplers of the present invention can be located at taps on the transmission line with a spacing that corresponds to ¼ wavelength to produce quadrature samples. Since the interference pattern is formed by constructive and destructive combinations of the reference and echo RF signals, the combined magnitude can either increase or decrease along the line, relative to the reference pulse alone. The output samples can increase or decrease according to the interference pattern, i.e., signed magnitude samples are produced by the magnitude-only samplers. The combination of signed magnitude samples and ¼ wavelength spacing produce samples that represent all four phase quadrants. Thus, phase quadrature I and Q samples of the interference pattern can be obtained using magnitude-only samplers of the present invention.

The temporal location of the sampling gate can be fixed to provide response related to a fixed downrange zone. This is a preferred mode for motion sensing and for vibration sensing. Vibration sensing can be considered to be a form of motion sensing where the motion amplitude is shorter than ½ wavelength. The zone width is set by the sample aperture convolved with the width of the virtual transmit pulse $\Delta T$. Both can be as short as two RF cycles, less than 80 ps at 24 GHz. This corresponds to UWB radar bandwidth, yet the RF pulse width of the present invention a can be greater than 1-microsecond and the occupied bandwidth (where 99% of the emission power is contained) can be less than 10 MHz.

The temporal location of the sampling gate can be swept to provide an A-scan response that is useful for rangefinding and imaging. An A-scan is a 1D image in the downrange direction. A 2D image can be formed by sweeping an A-scan radar antenna in one physical dimension, and a 3D image can be formed by sweeping in 2D. The present invention can be used to form high spatial resolution images using conventional image processing, e.g., back-propagation, or by using holographic processing, while operating the radar within a narrow ISM band. For example, a ground penetrating radar GPR can be operated in the 26 MHz wide 900 MHz ISM band with just 10 MHz occupied bandwidth while resolving just two cycles of RF, about 500 MHz effective bandwidth. In effect, a 50:1 bandwidth reduction is achieved.

The present invention can also operate in a non-staggered PRI mode. In this mode, the entire portion of the RF burst that precedes the range gate contributes to the echo sample. Range information is lost. However, a maximum range limit is defined by the temporal location of the range gate; no echoes after the range gate are sampled. This mode is useful where a maximum range limit is desired such as simple motion sensing, and having a maximum range limit is a major improvement over clutter-prone prior holographic radars that have no range limit.

Specific Description

Turning now to the drawings, FIG. 1 is a block diagram of an exemplary range gated holographic radar, generally 10. A PRI (pulse repetition interval) generator 12 outputs pulses that recur after a time duration or interval, e.g., every 1-microsecond. The reciprocal of PRI is PRF, the pulse repetition frequency, e.g., 1 MHz. Noise generator 13 can modulate the PRI to spread the RF emission spectrum and reduce interference to and from other spectrum users.

The PRI generator is coupled to stagger modulator 14. The stagger modulator outputs one pulse for each PRI pulse it receives from the PRI generator. Some output pulses are delayed, or staggered, more than others. Stagger modulator 14 is responsive to inputs from intermediate frequency IF generator 22. The IF generator can output a squarewave, for example, with a frequency of less than the PRF—an intermediate frequency between the PRF and the final detected signal frequency of radar 10 on line 40. In response to the IF generator signal, the stagger modulator output consists of a pulse train of N pulses with no delay relative to its input, and then, N pulses that are delayed a fixed amount. The total time of these two epochs is 2N*PRI, and the reciprocal 1/(2N*PRI) =IF. N can be an arbitrary integer, 1, 2, 3, . . . . Line 23 couples PRI pulses to the PRI generator when the IF is desired to be related to the PRF, e.g., an integer sub-multiple as might derived from a digital counter. Alternatively, IF generator 22 can be an independent oscillator, pseudorandom pulse generator, or coded pattern generator.

Stagger modulator 14 drives a first pulse generator 16, which outputs pulses on line 17. The duration of the output pulses is greater than or equal to the pulse-echo duration of a pulse propagating from antenna 20 to a desired target and back to antenna 20. An optional control input port labeled "TX width" allows the output width of pulse generator 16 to be scaled, for example, in response to target range estimates or for motion detection zone control.

RF oscillator 18 outputs RF pulses to antenna 20, each pulse consisting of a burst of two or more RF sinusoids. Exemplary waveform 62 of FIG. 3a indicates a transmit RF burst. The duration of the burst is long, long enough that it persists when the desired echo returns. Due to substantial pulse-echo delays encountered in most radar applications, the burst duration is long and the associated emission bandwidth is low, i.e., narrowband. Narrowband RF emissions are widely allowed by regulatory agencies in the unlicensed ISM bands.

PRI generator 12 is also coupled to range delay 24, which delays the PRI generator pulses by an amount equal to the expected target delay. An optional input labeled "range" can control the range gate timing in a specific manner. For example, the range input can be used to linearly sweep the range delay to produce an A-scan response at the output of radar 10. The range input can also be used to set the depth of a 2D scanned holographic radar image. Changes in the range input can change the depth, or downrange, location of the hologram, so holograms stacked in depth can be produced. The range control can also be adjustable, but fixed relative to the transmit RF burst, to set the sensing zone location in a motion sensing embodiment of radar 10. However the range delay element is controlled, a specific temporal relationship to the time of emission of the transmit pulse is involved, i.e., controlled timing is involved.

Range delay 24 is coupled to second pulse generator 26, which outputs gate pulses on line 27. The duration of the output pulses sets the temporal sampling aperture of magnitude sampler 28. The aperture must span at least two RF burst sinusoids, e.g., 200 ps for 10 GHz radar. An optional control input port labeled "gate width" allows the output width of pulse generator 26 to be scaled, for example, in response to radar resolution requirements or to set motion sensing zone dimension.

Gate pulses from gate pulse generator 26 are coupled to magnitude sampler 28, which employs a gated peak detector to produce phase-independent magnitude samples of an RF signal on input line 29. The transmit RF burst from RF oscillator 18 and received echo bursts from antenna 20 vector-sum on line 29 to produce an interference pattern, i.e., an interferometric pattern, on line 29. The sampler operates by peak detecting RF signals with a time-gated peak detector and by integrating the peak detector output to provide an output sample on line 31. When the gate pulse spans at least two RF cycles, two RF peaks always occur within the duration of the gate pulse. Since the sampler can be configured to maximally respond to two RF peaks, sample amplitude is unaffected by the phase of the RF signal relative to the gate pulse.

Phase independence is desirable since very small changes in phase may need to be detected within the interference pattern on line 29. Phase and amplitude changes on line 29 can be extremely small since echoes from a distant target are extremely small relative to the transmit burst signal. In effect, the interference pattern can be of very low contrast. A phase sampler would introduce a very large phase noise component due to phase noise between the transmit burst and the gate pulse, rendering radar 10 essentially inoperative.

Magnitude sampler 28 outputs samples on line 31 to IF filter 30. For each PRI, a sample is taken, and thus samples on line 31 can occur at a high rate equal to the PRI. However, stagger modulator 14 introduces an intermediate frequency modulation component to the sample stream on line 31 that IF filter 30 passes while rejecting spectral components at the PRF and at frequencies below the IF, e.g., spurious Doppler components. Filter 30 can be a bandpass filter. An optional IF amp 32 can amplify the IF signal. Amplifier 30 may also be located ahead of filter 30.

IF detector 34 converts the IF signal to a baseband signal on line 35. It can be implemented with, for example, a synchronous demodulator or an envelope detector. The synchronous demodulator can be a mixer or analog switches driven by an IF local oscillator signal provided by IF generator 22 on line 37. Alternatively, a rectifying type envelope detector can be used. Other methods of AM demodulation known in the art can be used.

Optional baseband filter 36 and baseband amplifier 38 can be employed to further filter and amplify the detected radar signals before being output from radar 10 on line 40. The radar output can be coupled to an optional processor, alarm, display, or controller for uses known in the various arts.

Figure 2:
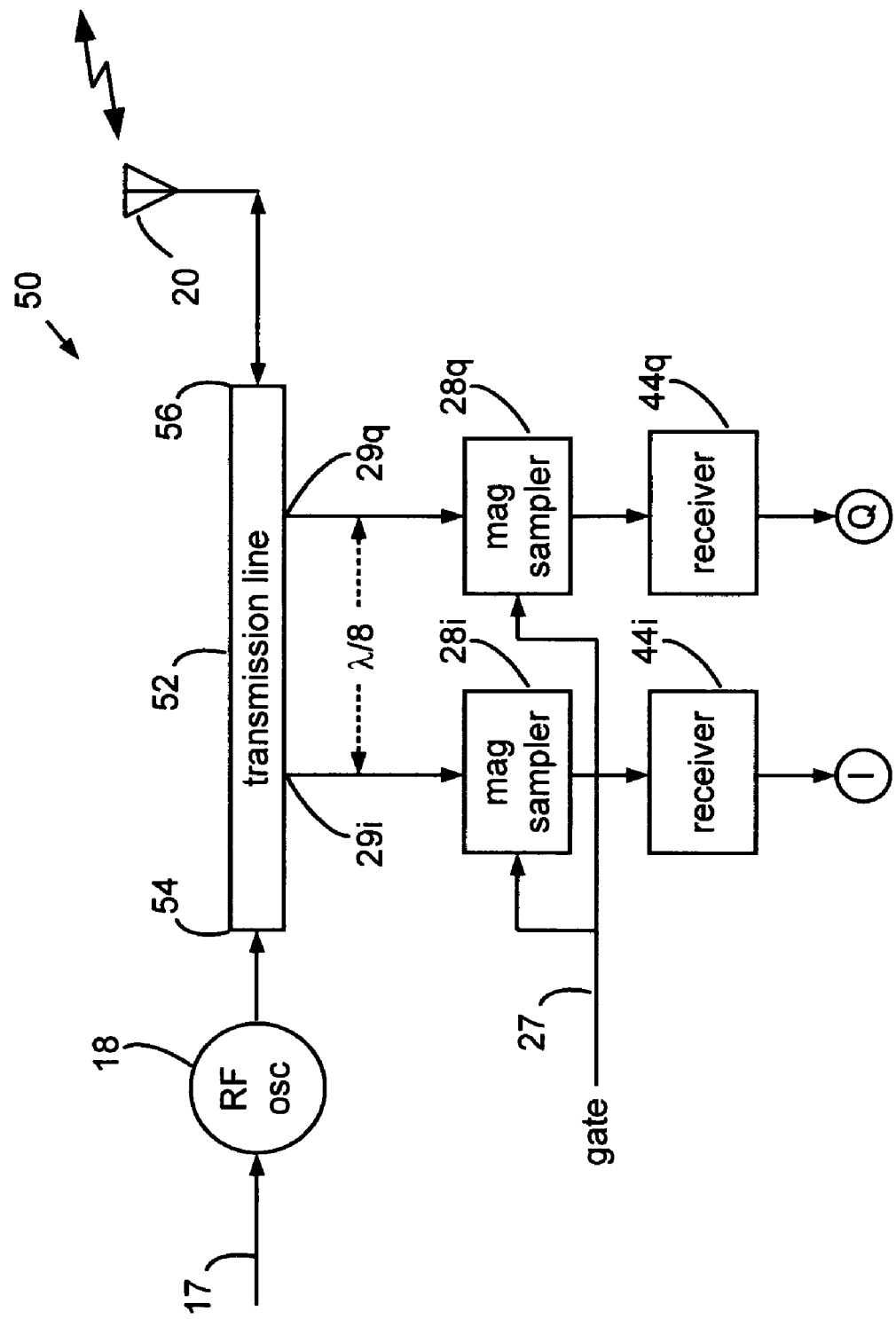
FIG. 2 is a diagram of a quadrature detector for the radar.

FIG. 2 block diagrams a quadrature version of magnitude sampler 28. A transmission line 52 propagates transmit RF bursts from end 54 to end 56 for radiation via antenna 20. Echo bursts return from antenna 20 to line end 56. Transmit RF bursts are narrowband RF pulses such as burst 62 of FIG. 3a and are of sufficient duration as to extend beyond the time of occurrence of desired echoes. Echoes vector-sum with the transmit bursts to form interference patterns along line 52. Magnitude samplers 28i and 28q are coupled to taps at locations 29i, 29q. In this example, the samplers are gated by a common gate pulse applied on line 27; separate gate pulses with separate timing parameters can be applied for various purposes. Examples of transmission line 52 can include a microstrip, a coax, a waveguide or a lumped element structure. A quadrature network or various microwave phase splitters can be employed. In the event that line 52 is a waveguide, the taps can be waveguide current or voltage probes or ¼ wave monopole antennas inside the waveguide.

If taps 29i, 29q, i.e., coupling points, are spaced apart by ⅛ wavelength of the RF frequency, magnitude samples will be taken that represent in-phase I and quadrature phase Q components of the echoes. It is as though samples were taken ¼ wave apart by conventional phase-sensitive mixers. It should be noted that ⅛ wave spacing is used to achieve ¼ wave sampling due to 2-way travel on the line.

Magnitude samples of interferometric patterns produce signed magnitude samples, since echoes can have a phases that either add or subtract from transmit bursts. In holographic terms, transmit burst 62 is a reference wave. In RF terms, transmit burst 62 is a local oscillator signal. The combination of signed magnitude samples and ⅛ wave taps produce output samples at receiver 44i and 44q output ports labeled I and Q that fully represent the RF interference pattern in all four phase quadrants. Receivers 44i and 44q can include elements shown in receiver 44 of FIG. 1.

Figure 3A:
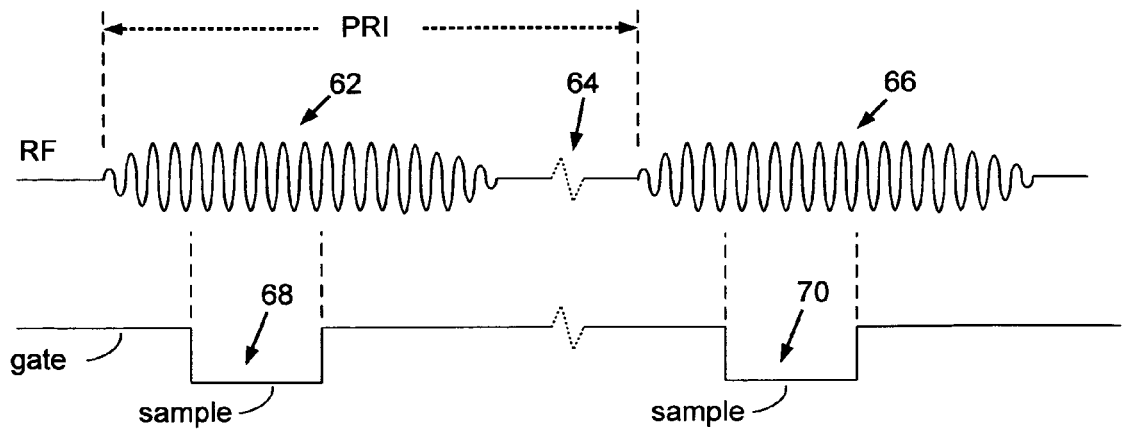
FIG. 3a is a waveform diagram of the RF and gate pulses.

FIG. 3a is a waveform diagram of exemplary radar 10. A narrowband RF burst 62 is shown in the upper trace labeled RF, representing an exemplary transmit RF burst. One burst consists of about 15 cycles in this example; often it can consist of hundreds of cycles. Each individual RF cycle has a positive and negative peak. Magnitude sampler 28 detects these peaks, and as a design choice, detection can be unipolar or bipolar.

Dashed zig-zag line 64 denotes a cut-out portion of the trace. Line 64 was added for clarity of explanation; without line 64 the line connecting burst 62 to burst 66 could be very long. Burst 66 is a repetition of burst 62. The interval from the start of burst 62 and to the start of burst 66 is the pulse repetition interval or PRI.

The lower waveform in FIG. 3a is a trace labeled "gate." It represents an exemplary gate pulse 40 that is coupled to sampler 28 to cause it to sample the interference pattern on line 29. The aperture of the sampler is set by the width of the gate pulse 68. For each gate pulse, the sampler can output a sample or it can output a moving average, or integration, of multiple repetitions that occur at the PRI.

Figure 3B:
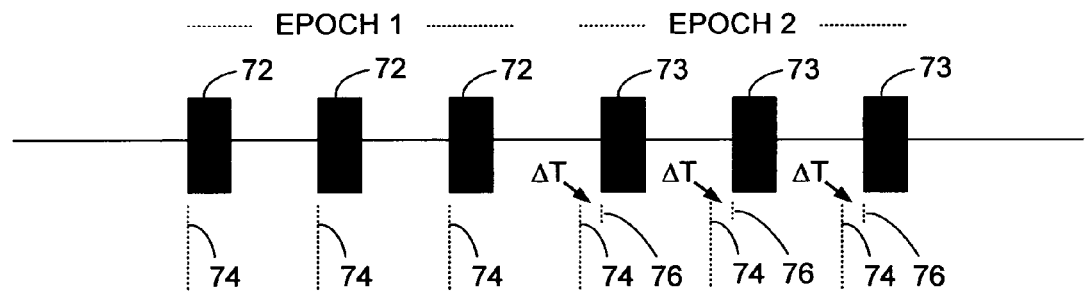
FIG. 3b is a waveform diagram of PRI stagger.

FIG. 3b depicts a first group of three transmit RF bursts 72, each starting at a reference time indicated by dashed line 74. A second group of transmit RF bursts 73 is further depicted, each starting at reference time 74 plus a stagger offset Δ, so the actual start time for these staggered bursts 73 is indicated by dashed timing reference line 76. The stagger offset can be defined as ΔT. The stagger period is six PRI's, and the corresponding intermediate frequency is PRF/6.

Figure 3C:
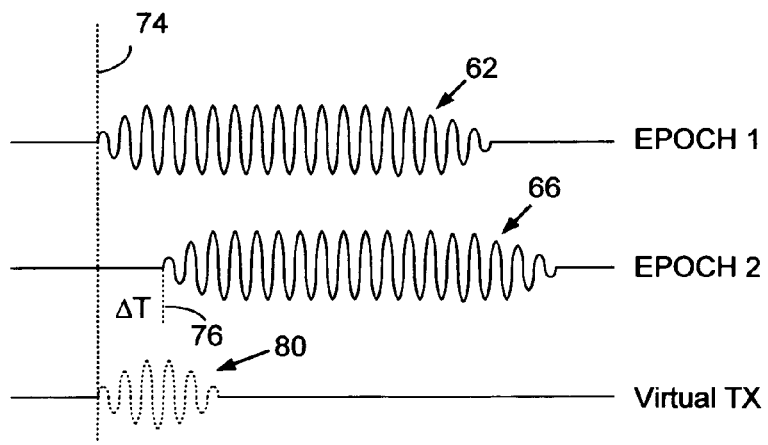
FIG. 3c is a waveform diagram of virtual transmit pulse generation.

FIG. 3c depicts a transmit RF burst 62 and a second burst 66 that is staggered by ΔT. Timing reference 74 from FIG. 3b is shown here to denote a common timing reference, which can be referenced to the PRI generator pulses. Thus, Δ is a delay or temporal offset from reference 74. Burst 62 can occur repeatedly during a first epoch, followed by bursts 66 during a second epoch. The repetition rate of the epochs recurs at an intermediate frequency. If the temporal location of gate 68 in FIG. 3a were set to the Δ interval, a very strong sampled signal at the IF would result; during epoch1 a maximal signal would be sampled, and during epoch 2 no signal would be sampled in the Δ interval. This sampled signal from the Δ interval appears as a narrow, virtual transmit burst 80 repeating at the IF. The term "virtual" is used since burst 80 doesn't exist physically; it is synthesized beat pattern from alternate groups of PRI's that have a staggered timing relationship. The Δ interval can be made very short, as little as two RF cycles, to produce a virtual UWB transmit pulse while using only long, narrowband transmit bursts. The width of gate pulse 68 can be set to Δ for optimal matched bandwidth sampling. It can also be set to other widths for various purposes, including defining a broad motion sensing zone.

Figure 4:
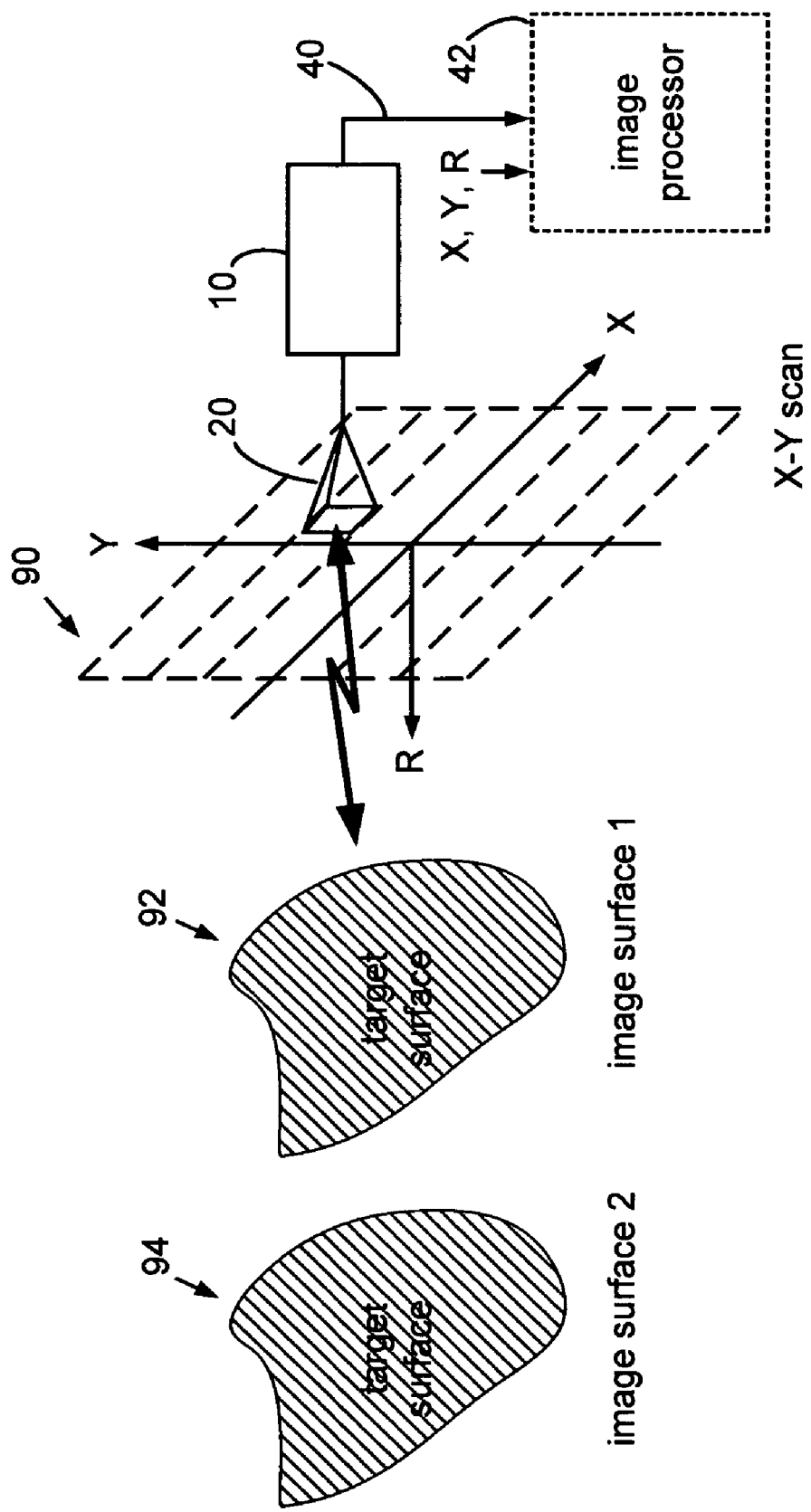
FIG. 4 depicts stacked hologram formation using a radar of the present invention.

FIG. 4 depicts holographic image formation using radar 10. Antenna 20 of radar 10 is scanned in X and Y dimensions, depicted schematically by scanning grid 90, to produce a hologram of an image surface 92. A physically translated single antenna or a switched antenna array can be used to scan. Interference patterns are produced on line 29, at sampler 28 input of FIG. 1, by a vector sum of the transmit RF bursts and echo bursts from a surface 92 at a specific range in the downrange direction R. Due to stagger modulation and subsequent creation of a short virtual transmit burst, range-gated sampler 28 can output interferometric data that is limited to a specific downrange zone. Two separate downrange zones, 92 and 94 are indicated in FIG. 4. Thus, holograms can be formed in these zones while excluding echoes from other zones. Each zone-limited hologram can represent, for example, an image surface at a specific depth in a material or tissue. Image processor 42 can produce images based on X, Y, and R spatial data and quadrature range gated samples output from radar 10 on line 40.

Figure 5:
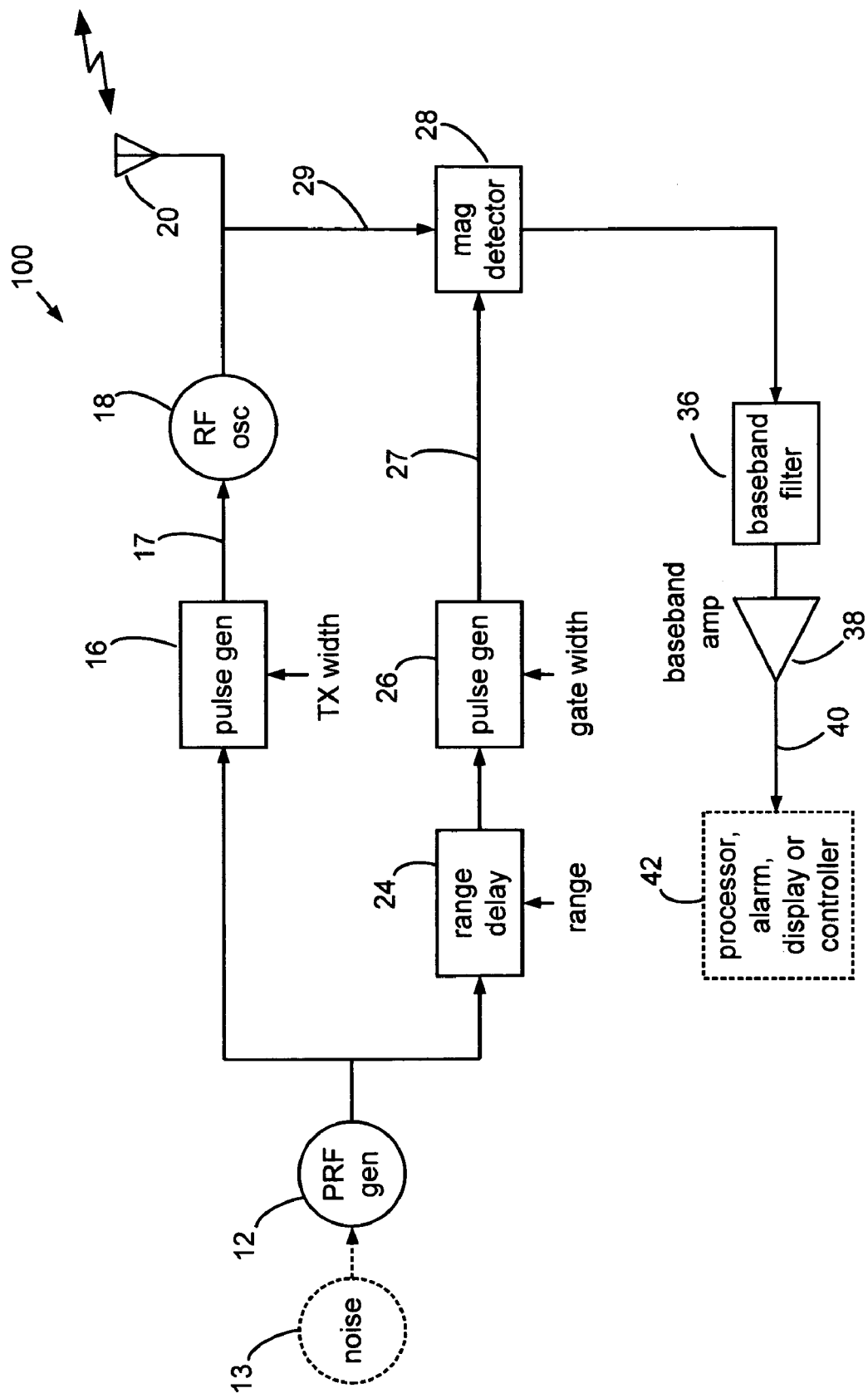
FIG. 5 is a block diagram of a direct baseband processing radar of the present invention.

FIG. 5 is a block diagram of an exemplary range gated interferometric radar, generally 100, configured to operate without a staggered PRI. A PRI generator 12 outputs pulses that recur after a time duration or interval, e.g., every 1-microsecond. Noise generator 13 can modulate the PRI to spread the RF emission spectrum and reduce interference to and from other spectrum users.

PRI generator 12 drives a first pulse generator 16, which outputs pulses on line 17. The duration of the output pulses is greater than or equal to the pulse-echo duration of a pulse propagating from antenna 20 to a desired target and back to antenna 20. An optional control input port labeled "TX width" allows the output width of pulse generator 16 to be scaled, for example, in response to target range estimates or for motion detection zone control.

RF oscillator 18 outputs RF pulses to antenna 20, each pulse consisting of a burst of two or more RF sinusoids. Exemplary waveform 62 of FIG. 3a indicates a transmit RF burst. The duration of the burst is long, long enough that it persists when the desired echo returns. Due to substantial pulse-echo delays encountered in most radar applications, the burst duration is long and the associated emission bandwidth is low, i.e., narrowband.

PRI generator 12 is also coupled to range delay 24, which delays the PRI generator pulses by an amount equal to the maximum expected target delay. The range control can be adjustable, but fixed, to set the sensing zone location in a motion sensing embodiment of radar 10.

Range delay 24 is coupled to pulse generator 26, which outputs gate pulses on line 27. The duration of the output pulses sets the temporal sampling aperture of magnitude sampler 28. The aperture must span at least two RF burst sinusoids, e.g., 200 ps for 10 GHz radar. An optional control input port labeled "gate width" allows the output width of pulse generator 26 to be scaled, for example, in response to radar resolution requirements or to motion sensing zone dimensions.

Gate pulses from gate pulse generator 26 are coupled to magnitude sampler 28, which employs a gated peak detector to produce phase-independent magnitude samples of an RF signal on input line 29. The transmit RF burst from RF oscillator 18 and received echo bursts from antenna 20 vector-sum on line 29 to produce an interference pattern on line 29. The sampler operates by peak detecting RF signals with a time-gated peak detector and by integrating the peak detector output to provide an output sample on line 31. When the gate pulse spans at least two RF cycles, two RF peaks always occur within the duration of the gate pulse. Since the sampler can be configured to maximally respond to two RF peaks, sample amplitude is unaffected by the phase of the RF signal relative to the gate pulse.

Magnitude sampler 28 outputs a baseband signal to optional baseband filter 36, which can be a low pass filter.

Optional amplifier 38 can scale the baseband signal. Baseband signals from radar 100 are output on line 40 to optional processor, alarm, display or controller 42.

Figure 6A:
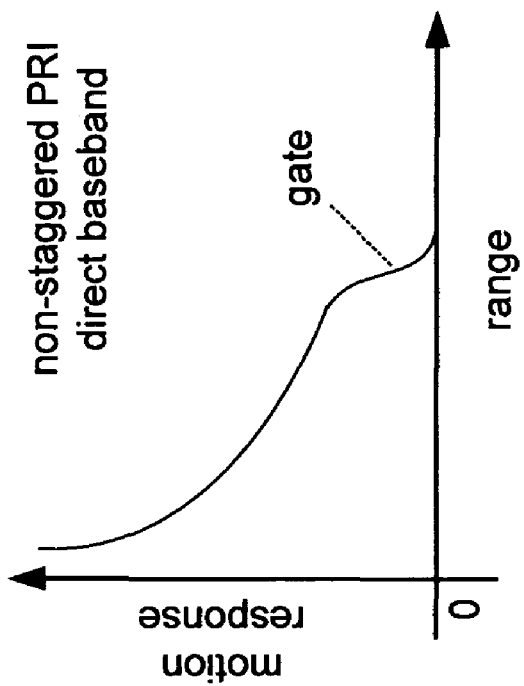
FIG. 6a plots motion sensing response using radar of FIG. 1.

FIG. 6a shows a response plot for a motion sensor implementation of radar 10. The range gate delay produced by element 24 in FIG. 1 is set to a fixed range and parameters in receiver 44 are set to pass motion signals produced by changes in interference patterns on line 29 caused by target motion. Response is plotted against moving target range and can be seen to be constant between the "near gate" and the "far gate." The near gate range is set by the time between the start of pulses 62 and 68 in FIG. 3a, divided by two for 2-way travel. The far gate is set by the end time of pulse 68, divided by two for 2-way travel. The flatness of the plotted response is idealized; actual response can be influenced by ambient pulse scattering, sampling convolution with the transmit burst and practical non-idealities. Response is absolutely zero beyond the far gate; there is no leakage.

Figure 6B:
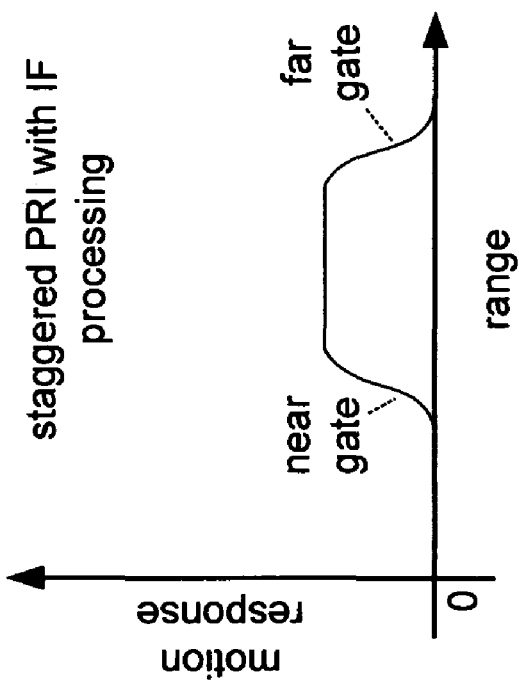
FIG. 6b plots motion sensing response using radar of FIG. 5.

FIG. 6b shows a response plot for a motion sensor implementation of radar 100. There is no PRI stagger and there is no short, virtual transmit burst. The range gate delay produced by element 24 in FIG. 1 is set to a fixed range and parameters in receiver 44 are set to pass motion signals produced by changes in interference patterns on line 29 caused by target motion. Response is plotted against moving target range and can be seen to be absolutely zero beyond the far gate; there is no leakage. Unlike the plot of FIG. 6a, there is no near gate and the voltage response varies with 1/(range squared), rising very rapidly as target range closes in to zero. This is undesirable in a motion sensor since it causes excess sensitivity to local vibrations, to insects near the antenna, and to locally generated electronic noise such as switching devices, e.g., transistors, that can create changes in the local radar reflectivity. Nonetheless, the simplicity of radar 100 outweighs the disadvantages in some applications. The entire portion of transmit burst 62 that precedes gate 68 contributes to the response in FIG. 6b. This can have an advantage in some applications where "filled volume" sensing is desired. In contrast, the plot of FIG. 6a forms a donut-shaped sensing zone that is not completely filled. Magnitude sampler 28 can be quadrature sampler 50 for either radar 10 or radar 100. Quadrature sampling can resolve downrange direction of motion. It can also eliminate periodic downrange vibration sensing nulls that repeat every quarter wavelength.

Figure 7:
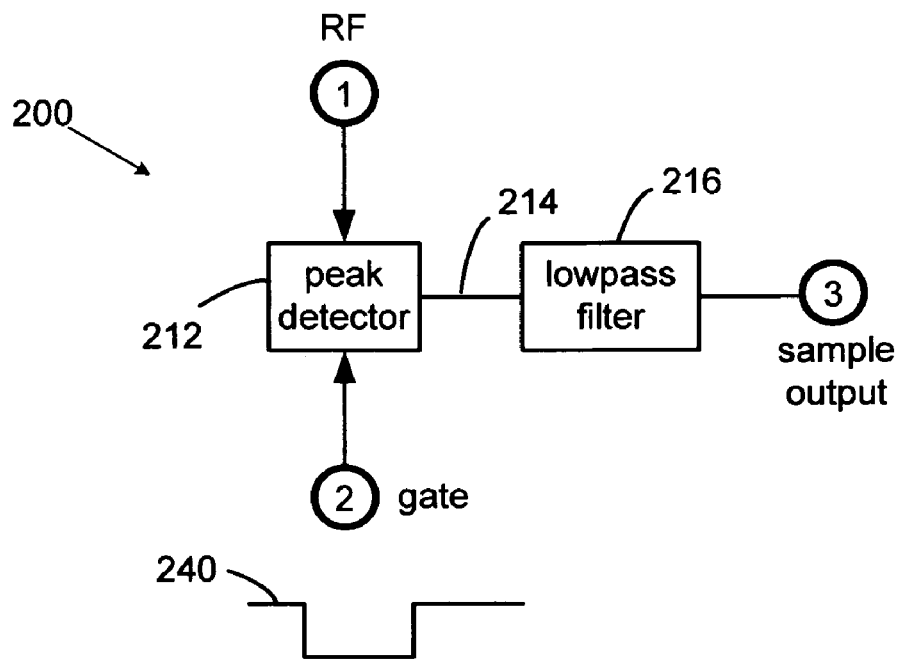
FIG. 7 is a block diagram of a sampler of the present invention.

FIG. 7 is a block diagram of an exemplary high resolution sampler for narrowband signals, generally 200. A gated peak detector 212 has an RF port, labeled port 1, a gate port labeled port 2 and a peak detector output line 214. Line 214 is connected to lowpass filter 216. The integrator produces a sample output signal at port 3. Lowpass filter 216 can also be an integrator. Gate pulses depicted by waveform 240 are applied to the gate port and bias-on the peak detector, causing it to peak detect for the duration of the of the gate pulse, e.g., during the negative portion of gate waveform 240. Gate waveform 240 can be derived from a radar range gate generator. The gate pulse need not have any particular phase relation to the RF signal applied to port 1. However, it must be sufficiently wide to include at least two RF input cycles, which would inherently include two lobes having two associated peaks. The peak detector charges to a peak voltage determined in part by the RF signal at port 1. Gate pulse 240 can be on the order of 1 ns wide, which spans 10 cycles of a 10 GHz RF signal, for example.

Gate pulse 240 is derived from a clock signal or a pulse PRI oscillator. The gate pulse is often the result of trigging on an edge of a clock waveform, where the clock could be a transmit or receive timing clock with a fixed or adjustable delay, or a swept delay between them.

In a radar receiver application, the gate pulse need not be tightly phase locked to the RF phase at port 1, as would be the case in stroboscopic, or down-converting, sampling type radars. This independence from RF phase is due to the fact that peak detector 212 will ideally detect the peak amplitude of the RF signal within two RF cycles, independent of the phase of the RF cycles relative to the gate pulse. It is only necessary that the gate pulse span at least two RF cycle to ensure at the peak detector settles to a maximum within the gate pulse duration.

Gate pulse 240 can span many RF cycles, e.g., an aggregate of 10 or more cycles in a narrowband RF packet or burst, and peak detector 212 can incrementally charge to a peak value across the aggregate, where each increment corresponds to an RF peak. Integration is thereby is performed during the peak detection process and peak detector hardware bandwidth requirements are minimized. As a further enhancement in some applications, peak detector 212 can hold its peak value with a small voltage droop across one or more pulse repetition intervals (PRI) to allow integration across multiple PRI's. Peak detector 212, in combination with lowpass filter 16 can integrate across a number of PRI's to reduce noise and interference levels.

Figure 8:
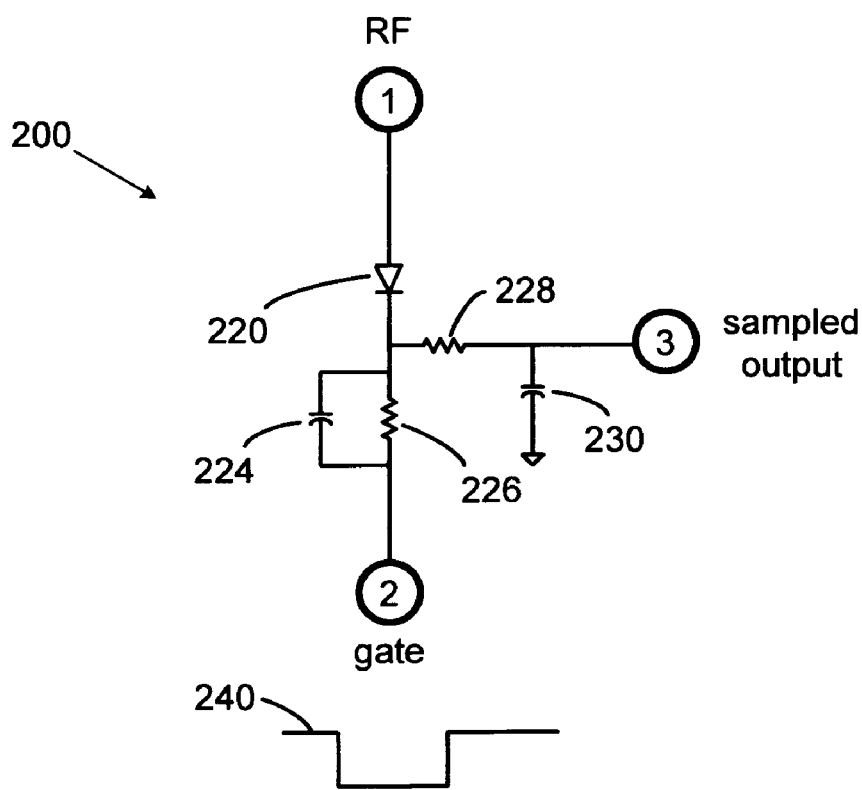
FIG. 8 is a schematic diagram of the sampler.

FIG. 8 is a schematic diagram of an exemplary sampler, generally 200. Diode 220 performs a peak detection function. It has an anode and cathode, and current (conventional current) primarily flows in one direction, from the anode to the cathode. In many applications, it is a Schottky diode. It can also be a diode formed by a transistor junction or by other diodes known in the art. Capacitor 224 is connected between the diode and gate port 2. It serves as a peak hold capacitor. Resistor 226 bleeds off the peak-held voltage at a rate determined by the application, and generally it must bleed off charge at a rate that can follow RF signal modulation. Resistor 228, in combination with capacitor 230, form a lowpass filter or an integrator. The lowpass filter provides RF isolation between diode 220 and output port 3; it blocks RF signals and gate pulses from coupling to output port 3. A time constant is formed by the product of resistor 228 and capacitor 230, which can be an integration time constant if set sufficiently large. Alternatively, if the time constant is short, the function of resistor 228 and capacitor 230 is mainly to block microwave frequencies and nanosecond speed gate pulses from appearing at port 3. Additional integration (i.e., time running averaging), or lowpass filtering, can occur downstream from port 3.

RF signals that are input to port 1 and gate pulses that are input to port 2 effectively add to the net voltage across diode 220. Diode 220 is driven into forward conduction when the net voltage exceeds its intrinsic threshold voltage, generally about 0.4V. Gate pulse 240 can have a voltage swing of 3V, while RF input signals are generally on the order of 1-100 mV. The upper level of gate pulse 240 is set to hold diode 220 biased OFF regardless of RF signal amplitude. When the gate pulse swings low, the combined RF and gate voltage bias-ON diode 220 during positive lobes of the RF signal. When the diode is biased-ON, diode conduction current pulses flow from the anode to the cathode of the diode. The diode conduction pulses flow into capacitor 224 and charge it to a maximum voltage that corresponds to the sum of the RF positive lobe peaks and the gate pulse. Substantial DC offsets exist due to the diode threshold and the gate pulse voltage. When no RF is present, capacitor 224 charges to a quiescent voltage due to repetitive gate pulses. RF signals produce incremental changes from the quiescent voltage on capacitor 224. Generally, DC offsets are of little concern since the sampled output at port 3 is generally amplified by an AC coupled amplifier or a bandpass filter. The location of diode 220 can be interchanged with capacitor 224 and resistor 226 with no change in operation, in principle. Diode 220 can be reversed, with a corresponding inversion of gate pulse 240.

Figure 9A:
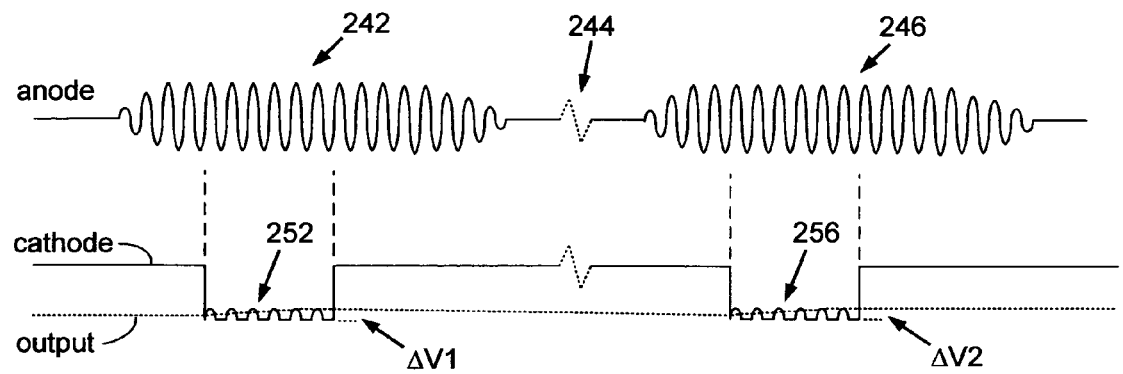
FIG. 9a is a waveform diagram of the sampler with a narrowband RF signal.

FIG. 9a is a waveform diagram of an exemplary sampler. A narrowband RF burst 242 is shown in the upper trace. One burst consists of about 15 cycles in this example; often it can consist of hundreds of cycles. Each individual RF cycle has a positive and negative peak. The present invention detects such peaks, often of one polarity only. Balanced, two polarity detectors can be configured by reversing the polarity of the diode and gate pulse in a second detector.

Dashed zig-zag line 244 denotes a cut-out portion of the trace. Line 244 was added for clarity of explanation; without line 244 the line connecting burst 242 to burst 246 could be very long. Burst 246 is a repetition of burst 242. The occurrence interval between the starts of burst 242 and burst 246 is the pulse repetition interval or PRI. The PRI can be staggered or otherwise modulated.

The lower waveform in FIG. 9a shows a solid trace labeled "cathode" and a dashed trace labeled "output." The cathode trace represents the voltage at the cathode of diode 220. It consists of gate pulse 240 that is coupled to the cathode, and positive RF signal peaks 252 and 256 from bursts 242 and 246 that couple from the anode to the cathode via diode conduction. Conduction occurs on at least a portion of the RF cycles that occur within the gate pulse duration, as indicated by the output trace.

The dashed trace is the voltage measured across peak hold capacitor 224. This is a differential voltage, i.e., the difference between the two plates of the capacitor. Gate pulse 240 appears on both plates equally and does not affect the exemplary differential trace. Diode conduction current pulses charge capacitor 224. Incremental charge voltages $\Delta V1$ and $\Delta V2$ indicate small increments in the capacitor voltage as a result of peak conduction pulses associated with peak voltages 252 and 256.

Voltage on capacitor 224 is coupled to output port 3 via a lowpass filter, e.g., resistor 228 and capacitor 230. This filter blocks pulses 252 and 256 from appearing at the output port. Resistor 228 allows for RF and gate pulse voltage swings at the cathode without introducing a shunting effect by capacitor 30 or by a load at port 3. Voltages appearing at the output port can be smoothed versions of $\Delta V1$ and $\Delta V2$. Either or both capacitors 224 and 230 can be sufficiently large as to integrate individual pulses 252, 256 across two or more PRI's. The amount of integration is a design choice.

Figure 9B:
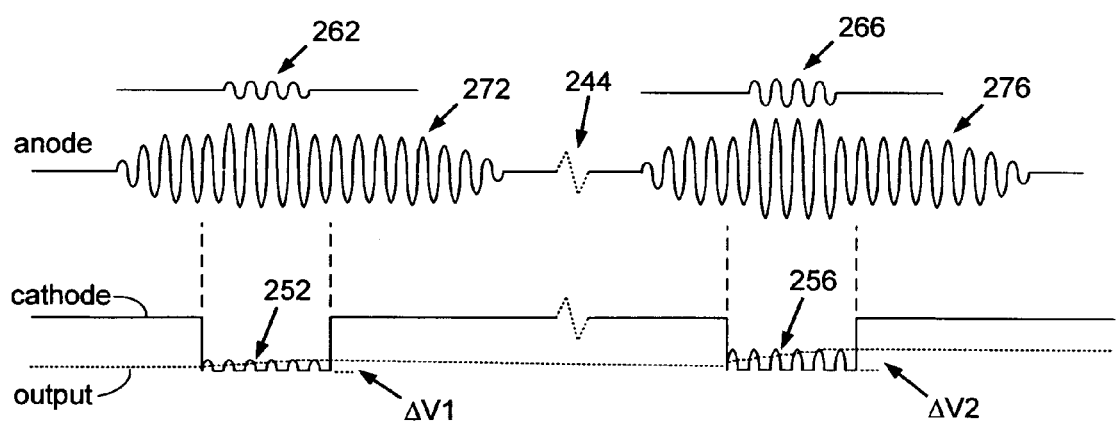
FIG. 9b is a waveform diagram of the sampler with a narrowband interferometric RF signal.

FIG. 9b depicts the further inclusion of echo pulses 262, 266. Depending on the exact phase of the echoes, they could add or subtract from RF bursts 242, 246. As shown, the echoes in this example add to form bursts 272, 276. Bursts 272, 276 are interferometric RF signals. Echo 266 is shown to be larger than echo 262 for illustrative purposes. Both echoes can be from the same target but the transmit amplitude can be modulated for the purpose of producing a modulated detected voltage, as seen by the differences $\Delta V1$ and $\Delta V2$ amplitudes in FIG. 9b.

Figure 10:
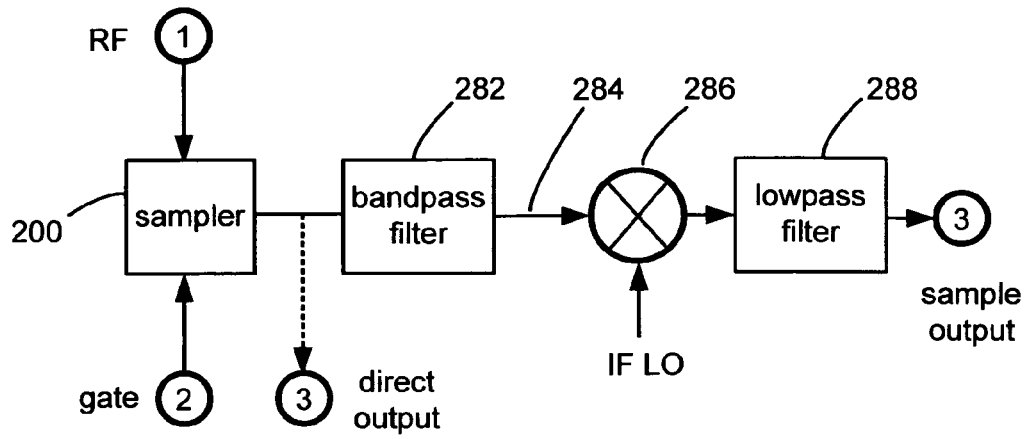
FIG. 10 is a block diagram of the sampler with an IF output.

FIG. 10 depicts sampler 200 additionally including a bandpass filter 282. Radar transmitters can amplitude modulate transmit RF pulses with each successive PRI or group of PRI's, to produce amplitude modulation of detected voltages $\Delta V1$ and $\Delta V2$. The modulation frequency must be lower than the inverse of the PRI, i.e., lower than the radar PRF. This frequency can be an intermediate frequency designated IF. Accordingly, bandpass filter 282 can be an IF filter and may include amplification. IF output from filter 282 can be coupled on line 284 to a mixer 286. Element 286 can also be analog switches or gates and may form a synchronous demodulation when switched, or mixed, with an IF local oscillator signal (IF LO). Element 286 can also be a simple diode-capacitor without an IF LO to simply envelop detect the IF signal on line 284. A lowpass filter 288 can be included to remove IF components and to pass detected baseband signals from element 286, and to provide a sample output signal at port 3. A dashed line and another port 3 are shown to indicate that sampler 200 can output both IF and "direct output" signals simultaneously for various radar purposes.

Figure 11:
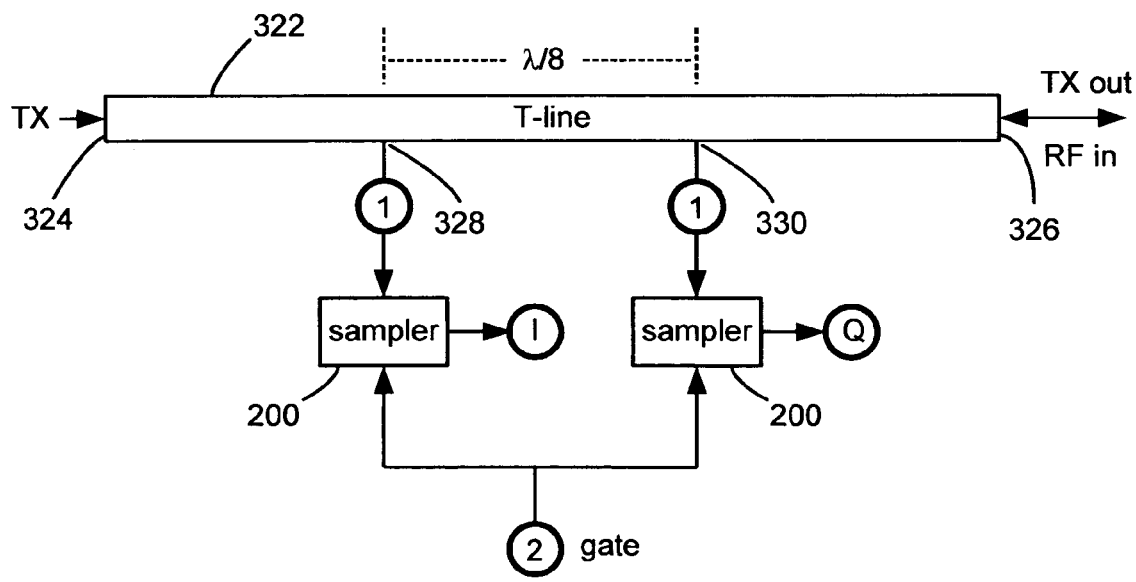
FIG. 11 is a block diagram of a quadrature configuration of the sampler.

FIG. 11 shows a quadrature version of exemplary sampler 200. A transmission line 322 propagates transmit radar pulses from end 324 to end 326 for transmission via an antenna or TDR line. Echoes return to line end 326. Transmit pulses are narrowband RF bursts such as bursts 242, 246 of FIG. 9a and are of sufficient duration as to extend beyond the time of occurrence of echoes. Echoes vector-sum with the transmit bursts to form interferometric patterns along line 322, similar to pulses 272, 276 of FIG. 9b. Two samplers 200 are coupled to taps at locations 328, 330. In this example, the samplers are gated by a common gate pulse applied to port 2; separate gate pulses can be applied for various purposes. Examples of transmission line 322 can include a microstrip, a coax, a waveguide or a lumped element structure. A quadrature network or various microwave phase splitters can be employed. In the event that line 322 is a waveguide, the taps can be waveguide current or voltage probes or ¼ wave monopole antennas inside the waveguide.

If taps 328, 330, i.e., coupling points, are spaced apart by ⅛ wavelength of the RF frequency, magnitude samples will be taken that represent in-phase I and quadrature phase Q components of the echoes. It is as though samples were taken ¼ wave apart by conventional phase-sensitive mixers. It should be noted that ⅛ wave spacing is used to achieve ¼ wave sampling due to 2-way travel on the line.

Magnitude samples of interferometric patterns produce signed magnitude samples, since echoes 262, 266 can have a phases that either add or subtract from transmit bursts 242, 246. In holographic terms, bursts 242, 246 are reference waves. The combination of signed magnitude samples and ⅛ wave taps produce output samples at ports labeled I and Q that fully represent the RF interference pattern in all four phase quadrants.

An RF signal is considered to include one or more cycles, each cycle having a positive and negative lobe, and each lobe having a peak. The use of the term "narrowband" herein refers to RF signals with a bandwidth that can fit in designated regulatory frequency bands, such as the ISM bands and other bands that are generally regarded as narrow plots of spectrum. Further, it can refer to amplitude modulated ON-OFF RF pulses with a number N of RF cycles in a burst, where N=2 and often 10 or greater. Since ultra-wideband signals have greater than 500 MHz bandwidth, narrow-band can be defined as having less than 500 MHz bandwidth. One example of a narrowband radar RF signal is a 1 MHz square-wave modulated 10.525 GHz RF carrier. Measurements indicate that such a carrier has less than 40 MHz occupied bandwidth (OBW, containing 99% of total power). Pulse holographic radar developed by the present inventor can exhibit spatial resolution normally associated with radar having 100 times more bandwidth.

Changes and modifications in the specifically described embodiments can be carried out without departing from the scope of the invention which is intended to be limited only by the scope of the appended claims.

What is claimed is:

1. A range-gated holographic radar, comprising:
a PRI generator for producing PRI pulses;
an intermediate frequency IF generator for producing an IF modulation signal;
a stagger modulator responsive to the PRI pulses and to the IF modulation signal for producing staggered PRI pulses;
a first pulse generator responsive to the staggered PRI pulses for generating transmit pulses having a duration longer than the longest transmit pulse to desired echo duration;
an RF oscillator responsive to the transmit pulses for producing transmit RF bursts and for forming reference waves;
an antenna connected to the RF oscillator for radiating the transmit RF bursts and for receiving echoes from the bursts;
a range delay element connected to the PRI generator for producing range delay pulses;
a second pulse generator responsive to the range delay pulses for generating gate pulses;
an RF magnitude sampler responsive to the gate pulses and connected to the antenna for producing RF magnitude samples of the sum of the reference waves and echoes;
an IF bandpass filter for passing IF modulated magnitude samples; and
an IF detector for demodulating the filtered magnitude samples and for producing an interferometric output signal.

2. The radar of claim 1 wherein the magnitude sampler further comprises a gated RF peak detector for detecting and integrating RF pulse peaks during one or more gate intervals.

3. The radar of claim 1 wherein the RF magnitude sampler further comprises a second RF magnitude sampler, each sampler coupled to spaced-apart taps on a transmission line connected between the RF oscillator and the antenna, for producing RF magnitude samples of the sum of reference waves and echoes and for producing quadrature interferometric output signals.

4. A range gated holographic radar sensor comprising:
a pulsed RF oscillator for providing RF bursts, each burst occurring with a stagger modulated PRI and having a burst duration longer than a pulse-echo interval from a desired target;
an antenna for transmitting RF bursts and for receiving echoes of the RF bursts; and
a time-gated RF sampler responsive to the sum of the RF bursts and stagger modulated echoes for producing range-gated interferometric output samples.

5. The radar of claim 4 wherein the stagger modulated PRI is modulated at an intermediate frequency.

6. A method of interferometric radar sensing, comprising:
generating an RF burst having a burst duration that is longer than a pulse-echo interval from a desired target;
radiating the RF burst from an antenna towards a target;
receiving the target echo of the burst with an antenna;
summing the RF burst and echo to produce an interference signal; and
magnitude sampling the interference signal with controlled timing to produce a range-gated interferometric sample of the echo.

7. The method of claim 6 further comprising sampling the magnitude of the interference signal at two points on a transmission line with controlled timing to produce range-gated quadrature interferometric samples.

8. The method of claim 6 further comprising generating an RF burst having a staggered PRI.

9. The method of claim 8 further comprising magnitude sampling that is responsive to the staggered PRI.

10. A method of interferometric radar motion sensing, comprising:
generating RF bursts having burst durations that are longer than a pulse-echo interval from a desired target;
radiating the RF bursts from an antenna towards a target;
receiving target echoes of the bursts with an antenna;
summing the RF bursts and echoes to produce interference signals;
magnitude sampling the interference signals with fixed timing relative to the RF burst to produce a sample signal from target echoes; and
detecting changes in the sample signal to produce a motion signal.

11. The method of claim 10 further comprising sampling the magnitude of the interference signals at two points on a transmission line with controlled timing to produce range-gated quadrature interferometric signals.

* * * * *